United States Patent
Grotmann et al.

(10) Patent No.: US 10,451,101 B2
(45) Date of Patent: Oct. 22, 2019

(54) TWO-STEEL SCREW WITH AN EXTRUSION CONNECTION AND METHOD FOR PRODUCING SAID SCREW

(71) Applicant: EJOT GmbH & Co. KG, Bad Berleburg (DE)

(72) Inventors: Dieter Grotmann, Erndtebrück (DE); Tobias Kettner, Erndtebrück-Birkelbach (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 263 days.

(21) Appl. No.: 15/122,952

(22) PCT Filed: Feb. 10, 2015

(86) PCT No.: PCT/EP2015/052762
§ 371 (c)(1),
(2) Date: Sep. 1, 2016

(87) PCT Pub. No.: WO2015/135710
PCT Pub. Date: Sep. 17, 2015

(65) Prior Publication Data
US 2017/0074311 A1    Mar. 16, 2017

(30) Foreign Application Priority Data
Mar. 12, 2014 (DE) ........................ 10 2014 204 598

(51) Int. Cl.
*F16B 35/04* (2006.01)
*F16B 25/10* (2006.01)
(Continued)

(52) U.S. Cl.
CPC .............. *F16B 25/103* (2013.01); *B21K 1/44* (2013.01); *B21K 1/56* (2013.01); *B21K 25/00* (2013.01); *F16B 25/0094* (2013.01); *F16B 35/00* (2013.01)

(58) Field of Classification Search
CPC ......... F16B 25/0094; B21K 1/44; B21K 1/56; B21K 25/00
(Continued)

(56) References Cited

U.S. PATENT DOCUMENTS

| 5,205,466 A | 4/1993 | Ker |
| 5,213,459 A * | 5/1993 | Palm ..................... B23P 19/006 411/29 |

(Continued)

FOREIGN PATENT DOCUMENTS

| AU | 2009201409 A1 | 10/2009 |
| DE | 4310938 A1 | 1/1994 |

(Continued)

OTHER PUBLICATIONS

Search Report for DE 10 2014 204 598.3 dated Nov. 11, 2014.
International Search Report for PCT/EP2015/052762 dated May 8, 2015.

*Primary Examiner* — Gary W Estremsky
(74) *Attorney, Agent, or Firm* — Pearne & Gordon LLP

(57) ABSTRACT

The invention relates to a two-steel screw comprising a top part and a cutting part, the top part consisting of a corrosion-resistant material and having a screw head and a shank portion, and the cutting part consisting of a hardenable material, the top part being permanently connected to the cutting part in the region of the shank portion by way of impact extrusion.

7 Claims, 7 Drawing Sheets

(51) Int. Cl.
  *B21K 25/00*   (2006.01)
  *B21K 1/44*   (2006.01)
  *F16B 25/00*   (2006.01)
  *B21K 1/56*   (2006.01)
  *F16B 35/00*   (2006.01)

(58) Field of Classification Search
  USPC .......................................................... 411/424
  See application file for complete search history.

(56) References Cited

U.S. PATENT DOCUMENTS

| | | | | |
|---|---|---|---|---|
| 5,551,818 | A | * | 9/1996 | Koppel ................ F16B 19/083 411/387.1 |
| 5,634,755 | A | * | 6/1997 | Jones, Jr. ................ B03C 1/286 335/302 |
| 5,749,689 | A | * | 5/1998 | Konig ................ F16B 25/0084 408/231 |
| 6,464,442 | B1 | | 10/2002 | Stingl |

FOREIGN PATENT DOCUMENTS

| | | |
|---|---|---|
| DE | 19735963 A1 | 2/1998 |
| DE | 10033471 C1 | 12/2001 |
| DE | 102007047524 A1 | 4/2009 |
| DE | 102011053384 A1 | 3/2013 |
| EP | 1450054 A1 | 8/2004 |
| EP | 1564423 A1 | 8/2005 |
| EP | 2080916 A1 | 7/2009 |
| WO | 8805991 A2 | 8/1998 |
| WO | 0204822 A1 | 1/2002 |

\* cited by examiner

TWO-STEEL SCREW WITH AN EXTRUSION CONNECTION AND METHOD FOR PRODUCING SAID SCREW

CROSS-REFERENCE TO RELATED APPLICATION

This is a National Stage application of PCT international application PCT/EP2015/052762, filed on Feb. 10, 2015 which claims the priority of German Patent Application No. 10 2014 204 598.3, filed Mar. 12, 2014, both of which are incorporated herein by reference in their entirety.

The invention relates to a two-steel screw comprising a top part and a cutting part, the top part consisting of a corrosion-resistant material and having a screw head and a shank portion, and the cutting part consisting of a hardenable material.

The invention further relates to a method for producing a two-steel screw consisting of a top part made of a corrosion-resistant material and having a screw head and a shank portion, and a cutting part consisting of a hardenable material.

Such two-steel screws, as well as methods for producing such two-steel screws, are well known from the prior art. Thus it is known in particular from building technology for two-steel screws comprising a stainless top part for a building exterior to be provided, so that this top part is not exposed to any corrosion or rust. Furthermore, two-steel screws known from the prior art have a hardened part with a steel drill bit on the cutting part, so that on the one hand a stainless outer face of the two-steel screw which is exposed to the weather can be provided, whereas the hardened front part provides a drill bit.

For connection of the top part to the cutting part it is known from the prior art to stick the two parts together, to weld the two parts or to screw the two parts. In this case, it may be provided that both the top part and also the cutting part each have an internal thread and the two parts are connected to a threaded pin.

However, in the two-steel screws which are known from the prior art it has been shown that the top part and the cutting part cannot always be reliably connected to one another. Furthermore, in order to produce a thread on the shank of the two-steel screw it is necessary for the top part and the cutting part to be arranged axially in alignment with one another. Here too, substantial deviations occur in practice. Consequently, two-steel screws which are known from the prior art and methods for producing such two-steel screws entail substantial scrap rates and high testing costs.

The object of the invention, therefore, is to provide a two-steel screw, as well as a method for producing a two-steel screw, wherein the top part and the cutting part should be connected to one another simply and reliably.

The above-mentioned object is achieved by a two-steel screw having the features of claim 1. Further advantageous embodiments of the two-steel screw are disclosed in the subordinate claims. Accordingly, it is provided that the top part is permanently connected to the cutting part in the region of the shank portion by impact extrusion. When the cutting part is connected to the top part in the region of the shank portion, the shank portion and the cutting part together form the screw shank. A thread can then be applied, for example, to the screw shank. In this case, the top part is preferably produced from stainless steel, whereas the cutting part is preferably produced from hardened steel. In this case, it is particularly preferable if the top part is connected to the cutting part by means of a lateral impact extrusion process.

A particularly advantageous embodiment of the two-steel screw provides that the cutting part has a lug-like projection and that the top part has a cup-shaped recess on the shank portion, wherein the lug-like projection is arranged in the lug-like recess and axially undercuts the top part in the region of the lug-like recess at least partially. Such an axial undercut can be achieved in particular by a lateral impact extrusion process, wherein the material flow can take place transversely with respect to the direction of action of the pressing machine.

Advantageously, the cup-shaped recess and the lug-like projection are in each case arranged on an end face of the top part or of the cutting part respectively, said end face being arranged perpendicular to a central longitudinal axis of the screw.

Furthermore, it is particularly preferable if the lug-like projection completely fills the cup-shaped recess. Thus in a two-steel screw according to the invention a positively engaged connection of the top part to the cutting part can be provided.

Furthermore, it is advantageous if the cutting part is hardened, in particular case-hardened, and has a drill bit.

A further advantageous embodiment of the two-steel screw provides that in cross-section the cup-shaped recess has an (engaging) profile with a plurality of, preferably three, engaging segments. The engaging segments advantageously extend radially inwards into the cup-shaped recess. An undercut can then be provided between the cutting part and the top part, or between the lug-like projection and the cup-shaped recess, by the impact extrusion process, or by the lateral impact extrusion process, so that the top part and the cutting part are securely connected in the axial direction, that is to say in the direction of the longitudinal axis of the screw.

Furthermore, a transmission of torque from the top part to the cutting part can be provided by the provision of the engaging profile with the engaging segments. Thus with a two-steel screw according to the invention the top part can be reliably and simply connected to the cutting part both in the axial and also the radial direction.

In this case, it is particularly preferable if circular segments are provided in each case between the engaging segments. Consequently, when three engaging segments are provided, the engaging profile also has three circular segments. In this case, the circular segments can advantageously be arranged radially externally on the engaging segments in the cup-shaped recess.

Furthermore, it is advantageous if the engaging segments and the circular segments are arranged at an angle of approximately 120° C. relative to one another in the circumference of the cup-shaped recess.

A further advantageous embodiment of the two-steel screw provides that the cup-shaped recess has a first radius in the region of the circular segments and has a second, reducing radius which is smaller than the first radius in the region of the engaging segments. In particular, the engaging segments can be formed as reversed circular segments extending radially inwards towards the center of the recess.

The above-mentioned object is also achieved by a method for producing a two-steel screw having the features of claim 9. Such a method comprises the following steps: Pressing a cup-shaped recess with a predetermined depth into the top part in the region of the shank portion; producing the cutting part with a lug-like projection having a length greater than the depth of the recess; introducing the projection into the recess and connecting the top part and the cutting part by means of impact extrusion, so that the lug-like projection completely fills the shape of the cup-shaped recess. In this case, it is particularly preferable if a lateral impact extrusion process is used as the impact extrusion process.

During the production of the cutting part, said part can advantageously be impact extruded with a maximum impact extrusion ratio of 65%. After the connection, that is to say when the lug-like projection completely fills the shape of the cup-shaped recess, it is particularly preferable if the lug-like projection axially undercuts the cup-shaped recess at least partially. Since before the connection the lug-like projection has a length greater than the depth of the cup-shaped recess, as the material of the cutting part is displaced axially during the impact extrusion process it can spread in the radial direction into the cup-shaped recess. Thus convex segments which extend radially outwards are produced on the lug-like projection in a finally connected screw. The undercut can be provided by these convex projections, so that the top part is securely connected to the cutting part in the axial direction by positive engagement.

An advantageous modification of the method provides that the cup-shaped recess is pressed into the top part in an area ratio of approximately 50% to approximately 75% to a cross-sectional area of the shank portion. It has been shown that with such an area ratio a particularly reliable connection of the top part to the cutting part can be provided.

Furthermore, it is advantageous if during production of the cutting part the lug-like projection is produced in a circular cylindrical shape. In this case, the projection is advantageously formed with a smooth circumferential surface. The diameter of the circular cylindrical projection is preferably chosen so that it is smaller than or equal to the smallest internal diameter of the cup-shaped recess. Thus the projection can be simply introduced into the cup-shaped recess before the impact extrusion process takes place.

A further advantageous modification of the method provides that, as the cup-shaped recess is pressed in, an engaging profile with engaging segments is pressed into the top part. In this case, it is particularly preferable if the engaging segments extend radially inwards, so that after the connection by impact extrusion they can be used in order to improve the torque transmission between the top part and the cutting part.

A further advantageous modification of the method provides that after the connection of the top part and the cutting part a thread is rolled onto the shank portion and the cutting part. In this case, it is particularly preferable if the connection between the top part and the cutting part is further improved by the thread rolling.

It is particularly preferable if the top part and the cutting part are arranged axially in alignment before connection. In this case, it may be provided that when the top part and the cutting part are arranged in a press die they are arranged in alignment by the press die.

Furthermore, it is advantageous if the production of the cutting part and the connection to the top part are carried out in a multi-stage press.

Further details and advantageous modifications of the invention are apparent from the following description by which the embodiments of the invention shown in the drawings are described and explained in greater detail.

Figure 1:
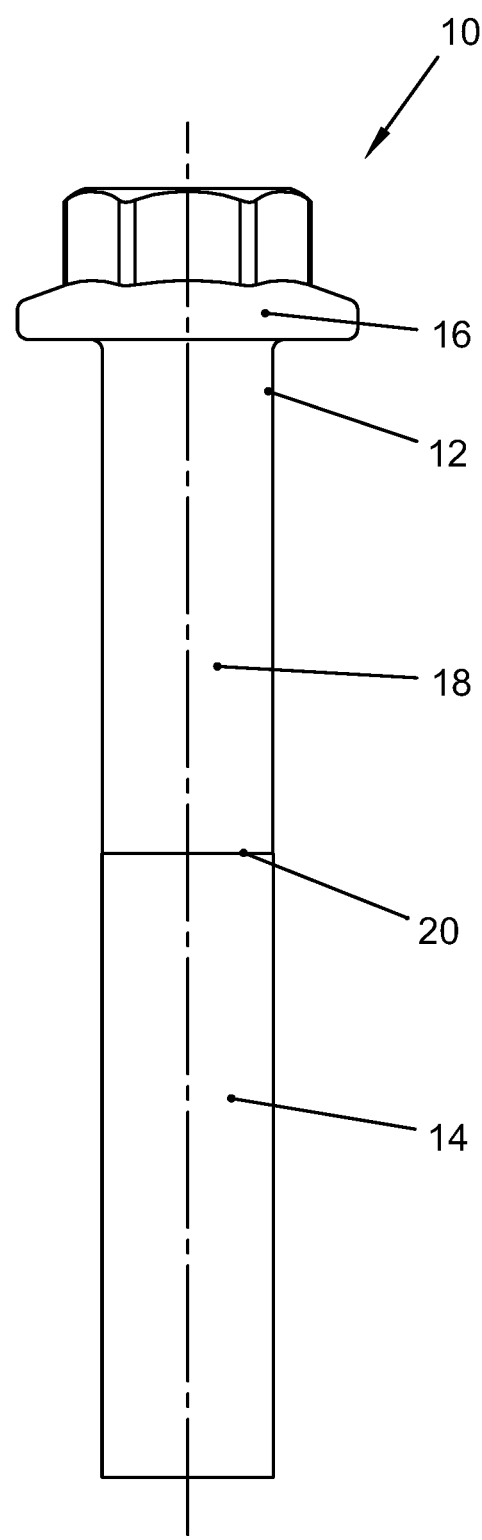
FIG. 1 shows an impact extruded two-steel screw.

FIG. 1 shows a two-steel screw 10, wherein the two-steel screw 10 has a top part 12 and a cutting part. The top part 12 also has a screw head 16 as well as a shank portion 18. The top part 12 and the cutting part 14 are connected to one another in the region of a joint 20 by means of an impact extrusion process.

Figure 2:
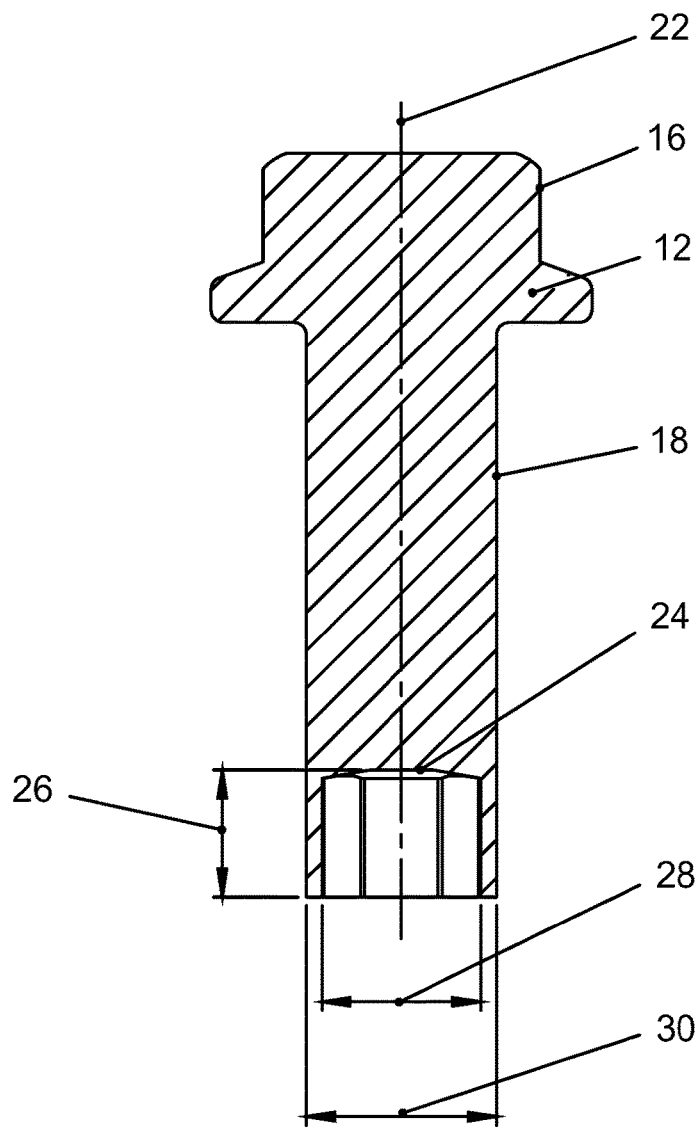
FIG. 2 shows a top part for the impact extruded two-steel screw according to FIG. 1.

FIG. 2 shows the top part 12 of the two-steel screw 10 shown in FIG. 1. In this case, the screw head 16 as well as the shank portion 18 can be seen clearly. The screw head 16 and the shank portion 18 are arranged concentrically with respect to a central longitudinal axis 22. On the side facing away from the screw head 16 the top part 12 has a cup-shaped recess 24. This cup-shaped recess has a depth 26, which extends in the axial direction, that is to say in the direction of the longitudinal axis 22. In FIG. 2, the cup-shaped recess 24 also has a diameter 28. The shank portion 18 of the top part 12 is formed as a circular cylinder and has a diameter 30. The cup-shaped recess 24 is preferably introduced into the shank portion 18 of the top part 12 by means of a pressing process. The cup-shaped recess 24 advantageously has an engaging profile shown in FIG. 7 which is described and explained in greater detail below with reference to FIG. 7.

Figure 3:
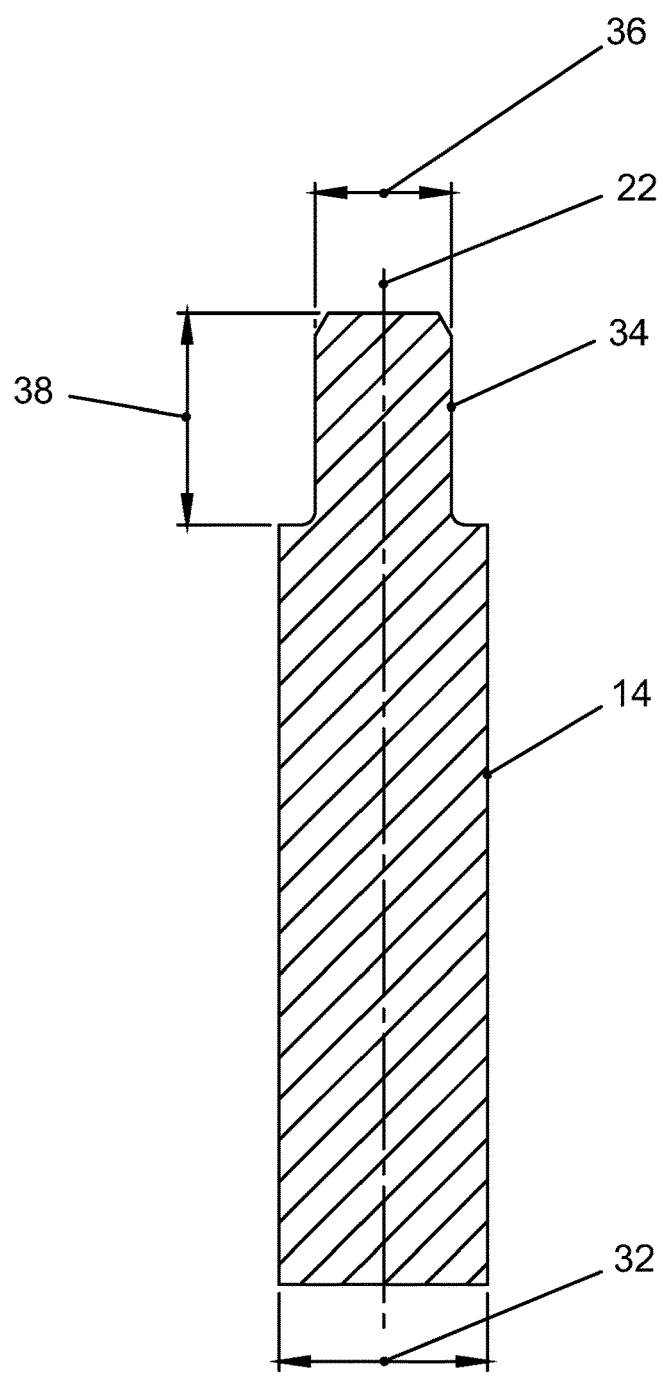
FIG. 3 shows a cutting part for the impact extruded two-steel screw according to FIG. 1.

FIG. 3 shows the cutting part 14 of the two-steel screw 10 shown in FIG. 1. The cutting part 14 has a diameter 32 which corresponds approximately to the diameter 30 of the shank portion 18 of the top part 12. The cutting part 14 also has a lug-like projection 34. The lug-like projection 34 and the cutting part 14 are arranged concentrically with respect to the longitudinal axis 22. The top part 12 has a diameter 36 in the region of the lug-like projection 34. Furthermore, the lug-like projection 34 has a length 38 in the direction of the longitudinal axis 22.

The length 38 of the lug-like projection 34 is greater than the depth 26 of the cup-shaped recess 24 of the top part 12. The length 36 of the lug-like projection 34 is smaller than the smallest diameter 28 of the cup-shaped recess 24.

Figure 4:
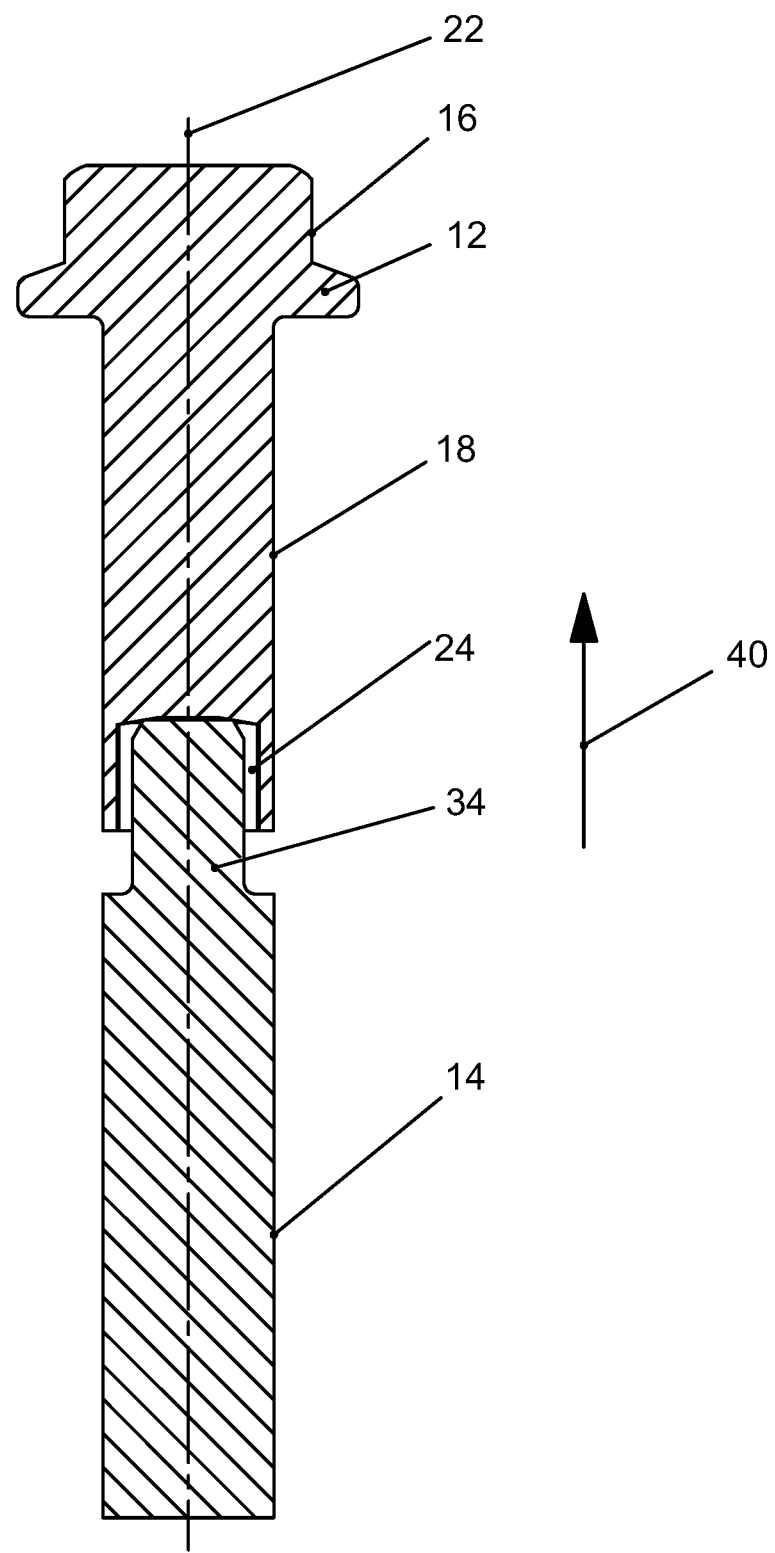
FIG. 4 shows in alignment the head and cutting parts of the two-steel screw according to FIG. 1 before the impact extrusion process.

This can be seen clearly in FIG. 4. FIG. 4 shows a top part 12 and a cutting part, wherein the top part 12 and the cutting part 14 are arranged axially in alignment along the central longitudinal axis 22. In this case, the lug-like projection 34 of the cutting part 14 is inserted into the cup-shaped recess 24 of the top part 12. The insertion of the lug-like projection 34 into the cup-shaped recess 24 can take place in the direction of the arrow 40. It can be seen clearly that the lug-like projection 34 has a greater length 38 than the depth 26 of the cup-shaped recess 24. Furthermore, it can be seen that the cup-shaped recess 24 has a greater diameter 28 than the diameter 36 of the lug-like projection 34. FIG. 4 shows the top part 12 and the cutting part 14 before the impact extrusion process is carried out.

Figure 5:
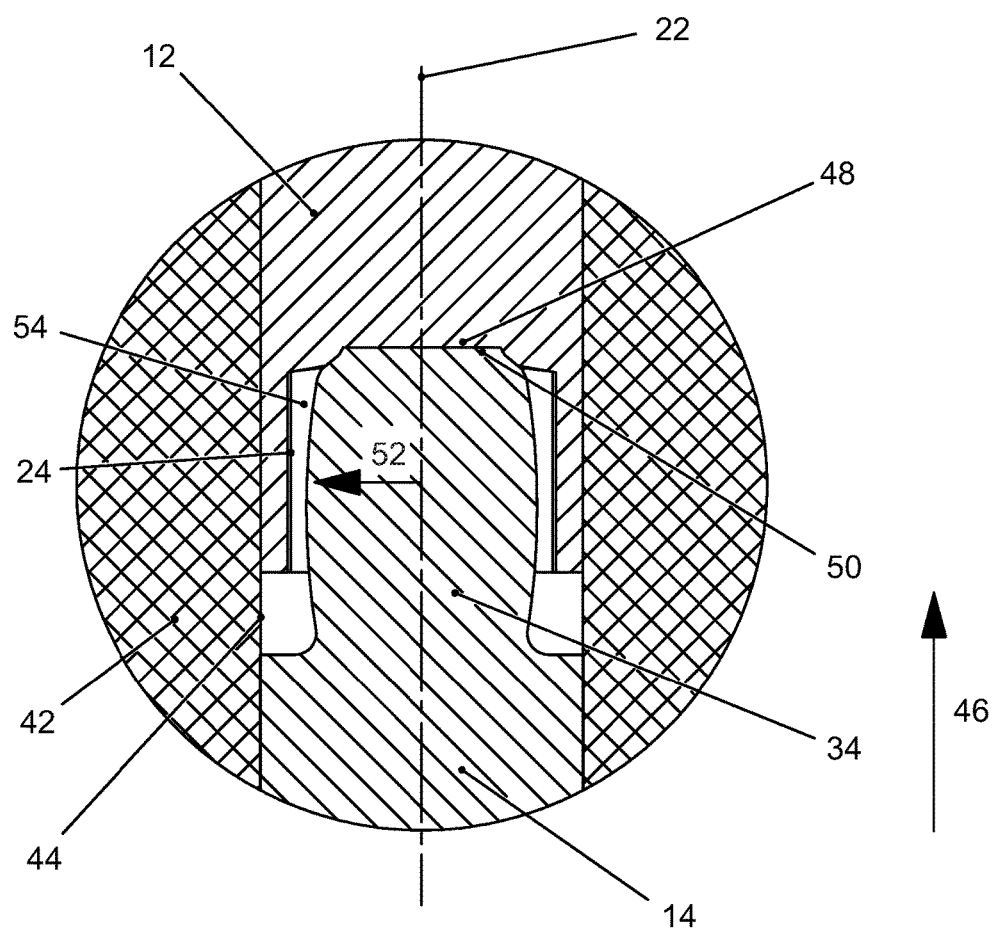
FIG. 5 shows a view of a detail of a top part and of a cutting part at the start of an impact extrusion process.

FIG. 5 shows an enlarged detail of a top part 12, wherein the lug-like projection 34 of the cutting part 14 is introduced into the cup-shaped recess 24 of the top part 34. The two parts, namely the top part 12 and the cutting part 14 are arranged in a die 42 of a multi-stage press and are supported on a circumferential surface 44 of the die 42. FIG. 5 shows the top part 12 and the cutting part 14 at the start of an impact extrusion process. The direction of action of the machine is represented by the arrow 46. If the cutting part 14 is moved further in the direction of the arrow 46 onto the top part 12 beyond the position illustrated in FIG. 4, an end face 48 of the lug-like projection 34 penetrates at least partially into a base surface 50 of the cup-shaped recess 24. Since a further axial deflection in the direction of the arrow 46 is delimited by the base 50 of the cup-shaped recess 24, material of the lug-like projection 34 can flow radially outwards in the direction of the arrow 52, i.e. transversely with respect to the arrow 46, into a hollow space 54 between the top part 12 and the lug-like projection 34 of the cutting part 14.

Figure 6:
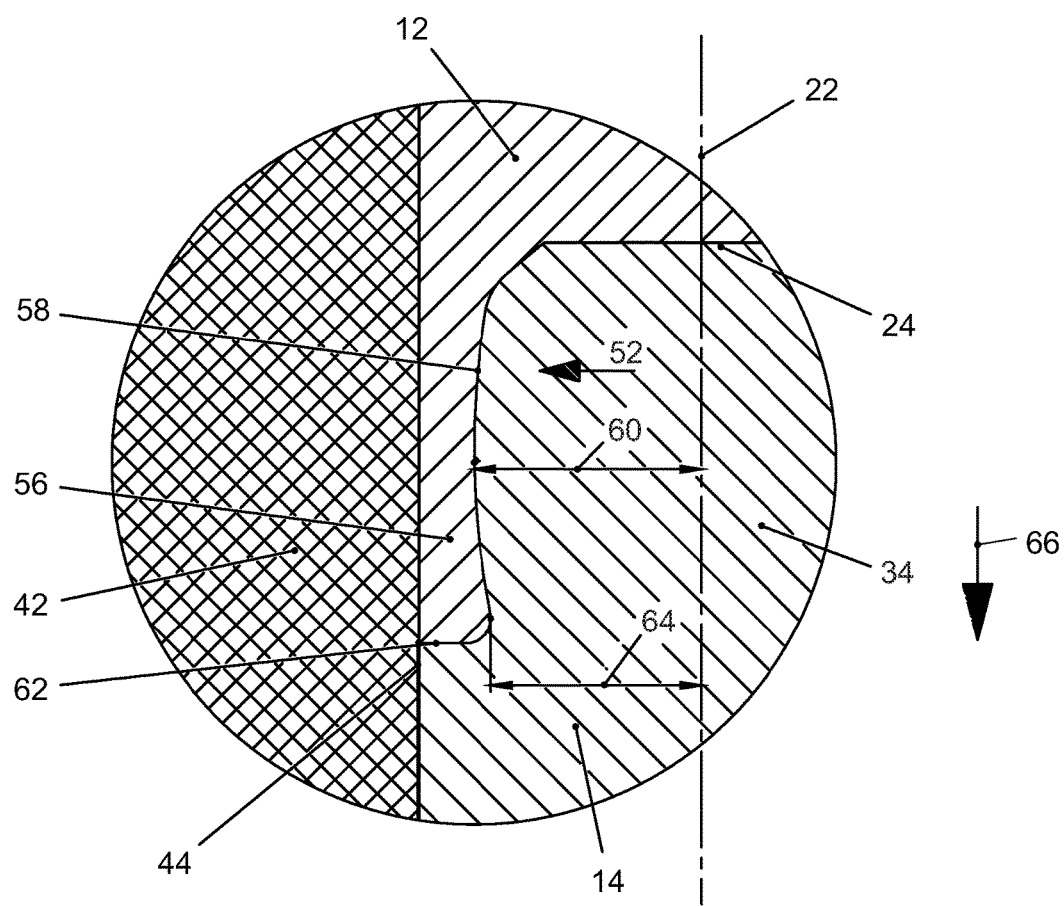
FIG. 6 shows a view of a detail of an impact extruded connection after the impact extrusion process.

FIG. 6 shows an enlarged detail of an impact extruded connection at the end of the impact extrusion process. The top part 12 and the cutting part 14 of the two-steel screw 10 are still arranged in a die 42 of a multi-stage press and are supported on the circumferential surface 44 of the die. The effect of the impact extrusion process in the direction of the arrow 52 can be clearly seen. Material of the lug-like projection 34 can flow transversely with respect to the direction of action of the press, that is to say transversely with respect to the direction represented by the arrow 46. In this case, the material flows into the hollow space 54 shown in FIG. 5 and fills it.

The movement of a side wall 56 of the top part 12 which forms the cup-shaped recess 24 is delimited by the circumferential surface 44 of the die 42, since the top part and the cutting part 14 are supported on the circumferential surface 44 of the die 42. At the end of the impact extrusion process the lug-like projection 34 fills the cup-shaped recess 24 completely.

As can be seen in FIG. 6, the lug-like projection 34 has a convexity 58. After the impact extrusion process, the lug-like projection 34 has a diameter 60 in the region of the convexity 58. At a transition region 62 to the lug-like projection 34 the lug-like projection 34 also has a diameter 64. The diameter 60 is greater than the diameter 64, so that the lug-like projection 34 undercuts the cup-shaped recess 24 in the axial direction. Thus a withdrawal of the lug-like projection from the cup-shaped recess 24 in the direction of the arrow 66 is no longer possible.

Figure 7:
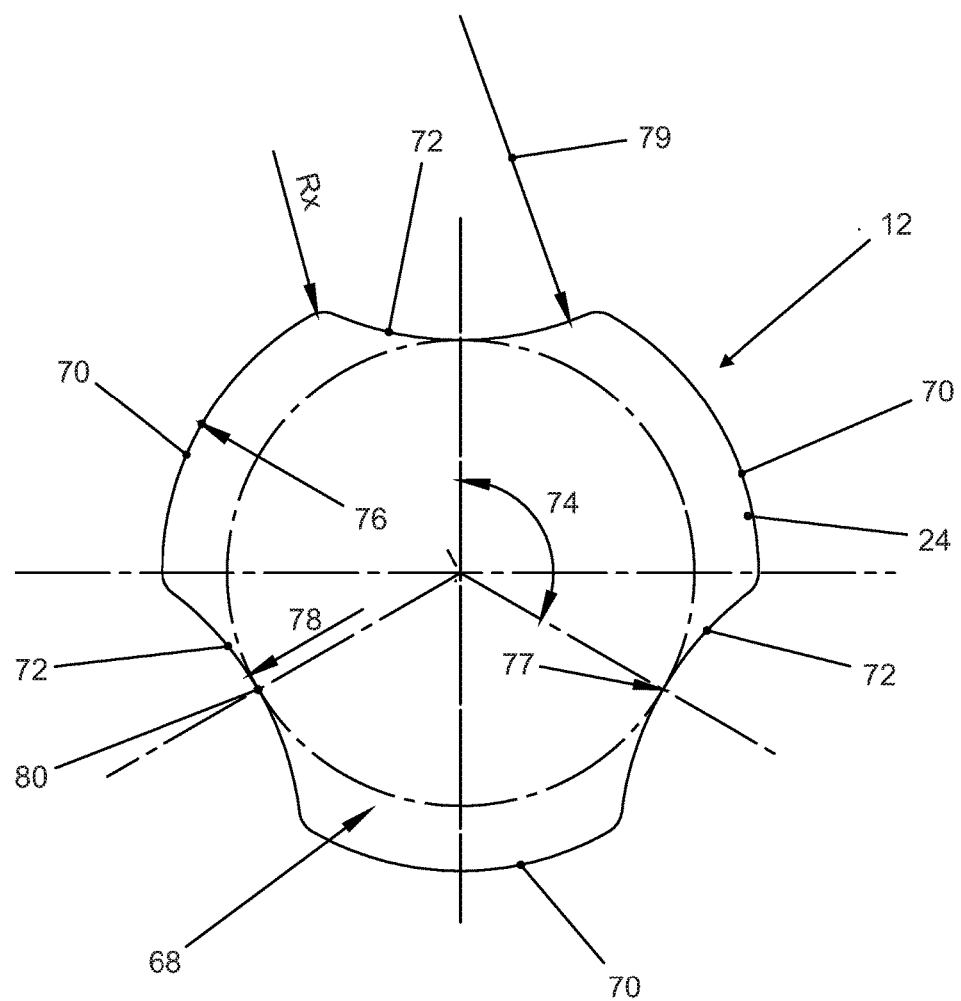
FIG. 7 shows a cup-shaped recess of the top part according to FIG. 2.

Since high torques must also be transmitted during the production of drilled holes, or during the use of two-steel screws 10, the cup-shaped recess of the top part 12 has an engaging profile 68 shown in FIG. 7, as already stated above. The engaging profile 68 is formed from circular segments 70 and between the circular segments 70 arranged engaging segments 72. In FIG. 7, three circular segments 72 are provided in each case, in such a way that they are arranged at an angle 74 of approximately 120° with respect to one another. In the region of the circular segments 70, the cup-shaped recess 24 has a radius 76 which is constant in the region of the circular segments 70. In the region of the engaging segments 72, the cup-shaped recess 24 has a radius 78 which reduces continuously in the region of the circular segments 72. This reducing radius 78 defines the distance which reduces in the region of the engaging segments 72 towards a bulge 77. The engaging segments 72 are formed as reversed circular segments and can also be defined by a radius 79 applied from the exterior.

If a cutting part 14 or a lug-like projection 34 of a cutting part 14 is introduced into the cup-shaped recess 24 of the top part 12 for the impact extrusion process, it is particularly preferable if the diameter 36 of the lug-like projection is chosen to be smaller than or equal to the smallest diameter of the cup-shaped recess 24 in the region of the center 80 of the engaging segments 72, so that the lug-like projection 34 can be introduced without problems into the cup-shaped recess 24. During the impact extrusion process material of the lug-like projection 34 can then spread into the hollow spaces 54 which are defined by the circular segments 70. Then in addition to the undercuts due to the convexity 58 which ensures a connection in the axial direction, a torque transmission in the radial direction can be provided because of the engaging profile 68.

The invention claimed is:

1. A two-steel screw comprising a top part and a cutting part, the top part consisting of a corrosion-resistant material and having a screw head and a shank portion, and the cutting part consisting of a hardenable material, wherein the top part is permanently connected to the cutting part in the region of the shank portion by way of impact extrusion,
   wherein the cutting part has a lug-like projection and the top part has a cup-shaped recess on the shank portion,
   wherein the lug-like projection is arranged in the cup-shaped recess and axially undercuts the top part in the region of the cup-shaped recess at least partially,
   wherein, in cross-section, the cup-shaped recess has an engaging profile with a plurality of engaging segments, and
   wherein circular segments are provided between the engaging segments.

2. The two-steel screw according to claim 1, wherein the lug-like projection fills the shape of the cup-shaped recess completely.

3. The two-steel screw according to claim 1, wherein the cutting part is hardened and has at least one drill bit.

4. The two-steel screw according to claim 1, wherein the engaging segments and the circular segments are arranged at an angle of 120° relative to one another in the circumference of the recess.

5. The two-steel screw according to claim 1, wherein, in cross-section, the cup-shaped recess has an engaging profile with three engaging segments.

6. A two-steel screw comprising a top part and a cutting part, the top part consisting of a corrosion-resistant material and having a screw head and a shank portion, and the cutting part consisting of a hardenable material, wherein the top part is permanently connected to the cutting part in the region of the shank portion by way of impact extrusion,
   wherein the cutting part has a lug-like projection and the top part has a cup-shaped recess on the shank portion,
   wherein the lug-like projection is arranged in the cup-shaped recess and axially undercuts the top part in the region of the cup-shaped recess at least partially,
   wherein, in cross-section, the cup-shaped recess has an engaging profile with a plurality of engaging segments,
   wherein circular segments are provided between the engaging segments, and
   wherein the cup-shaped recess has a first radius in the region of the circular segments and has a second reducing radius which is smaller than the first radius in the region of the engaging segments.

7. A two-steel screw comprising a top part and a cutting part, the top part consisting of a corrosion-resistant material and having a screw head and a shank portion, and the cutting part consisting of a hardenable material, wherein the top part is permanently connected to the cutting part in the region of the shank portion by way of impact extrusion,
   wherein the cutting part has a lug-like projection and the top part has a cup-shaped recess on the shank portion, wherein the lug-like projection is arranged in the cup-shaped recess and axially undercuts the top part in the region of the cup-shaped recess at least partially, wherein, in cross-section, the cup-shaped recess has an engaging profile with three engaging segments.

* * * * *